Figure 1:
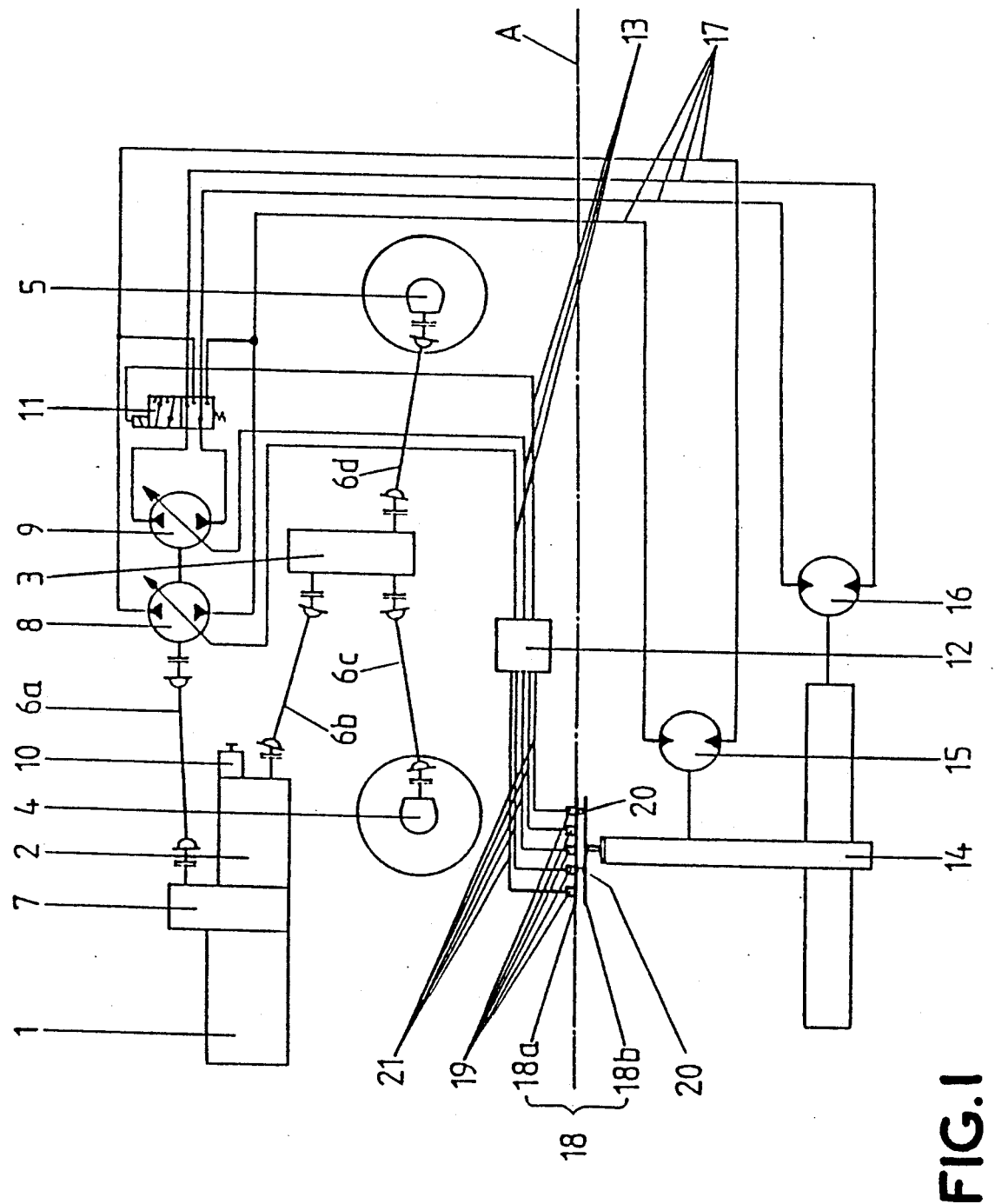

United States Patent [19]

Schmidt

[11] Patent Number: 5,074,373
[45] Date of Patent: Dec. 24, 1991

[54] DRIVE CONNECTION ON A SUPPORT VEHICLE

[76] Inventor: Alfred Schmidt, Dorf 35, 7821 Bernau, Fed. Rep. of Germany

[21] Appl. No.: 503,612

[22] Filed: Apr. 3, 1990

[51] Int. Cl.⁵ .............................................. B60D 1/62
[52] U.S. Cl. ...................................... 180/305; 172/3; 280/422
[58] Field of Search .................... 350/96.2; 439/34, 35; 280/420, 421, 422; 180/305, 306; 172/2, 3

[56] References Cited

U.S. PATENT DOCUMENTS

| | | | |
|---|---|---|---|
| 3,719,372 | 3/1973 | Rawlings | 280/422 X |
| 4,046,399 | 9/1977 | Zeuner et al. | 280/420 |
| 4,718,853 | 1/1988 | Orbanic | 280/422 X |
| 4,886,335 | 12/1989 | Yanagawa et al. | 350/96.2 |
| 4,915,466 | 4/1990 | Sorensen et al. | 350/96.2 |

FOREIGN PATENT DOCUMENTS 3722196 1/1989 Fed. Rep. of Germany ...... 280/422

Primary Examiner—Andres Kashnikow
Assistant Examiner—Michael Mar
Attorney, Agent, or Firm—Hefgott & Karas

[57] ABSTRACT

A drive connection on a support vehicle for interchangeable hydraulic attachments to be coupled to the support vehicle includes an electronic control apparatus and a plurality of circuit elements connected thereto and actuated when the attachment is mechanically coupled to the support vehicle so as to perform the programming of the control apparatus to adjust the hydraulic system in accordance with the requirements of the particular attachment in question.

12 Claims, 3 Drawing Sheets

DRIVE CONNECTION ON A SUPPORT VEHICLE

The invention relates to a drive connection on a support vehicle for interchangeable hydraulically driven attachments, having one or more hydraulic pumps provided at the vehicle end, their hydraulic control being adjustable by means of an electronic control apparatus programmable according to the basic data for hydraulic drive of one or more attachments.

It is known that support vehicles may be equipped with devices serving to operate various attachments in connection with the support vehicle. Often these attachments have hydraulic motors to be powered by hydraulic pumps provided at the vehicle end; in the case of road service vehicles, alternatively for example a shoulder mower, a sweeper, a snow blower, a snow plow etc. may be attached to the front end of the support vehicle. Depending on the kind of attachment in service at the time, the hydraulic system at the vehicle end must satisfy different boundary conditions, i.e. for example the volume flow, the maximum allowable and minimum required pressures as well as other quantities must be tuned to the particular attachment. This match between the hydraulic system at the vehicle end and the particular hydraulically driven attachment is brought about by means of an electronic control apparatus, suitably programmable and acting on the hydraulic control. Upon change of attachment, the operator of the support vehicle programs the electronic control apparatus accordingly.

In the known procedure for matching the basic setting of the hydraulic system to the particular attachment, a disadvantage is that the risk of improper operation cannot be excluded. Yet an improper basic adjustment of the hydraulic system may cause malfunctions of the attachment, damage to the hydraulic system, and even accidents.

The object of the present invention is to simplify and dependably secure the basic adjustment of the hydraulic system to match the particular attachment and especially to eliminate the hazard of improper operation.

According to the invention, this object is accomplished in that when the particular attachment is mechanically coupled to the vehicle, the programming takes place automatically by actuation of switches acting upon the electronic control apparatus and/or the hydraulic control certain switch elements spatially associated with each other at the attachment end and at the vehicle end entering into active connection with each other. According to the teaching of the invention, that is, simultaneously with the mechanical coupling of the attachment to the vehicle, a certain number and configuration of switches is actuated, which act especially on the electronic control apparatus and program it appropriately. In this way any mistakes in operation of the hydraulic system and hence any resulting hazard of malfunction, damage or accident is eliminated. Furthermore, the time required to change attachments is shortened, because the programming of the control apparatus as required heretofore need not be performed manually.

Within the scope of the invention, analog and digital circuit elements alike may be provided; in the former case, the circuit element emits a signal whose magnitude is for example proportional to the input quantity of the hydraulic control, as for example the volume flow, while in the latter case the number and configuration of the switches actuated determines a code whereby the electronic control apparatus calls up a basic adjustment fixedly programmed in. The use of analog circuit elements has the advantage that a relatively simple electronic control apparatus will suffice; in some cases, i.e. where the analog signals of the circuit elements are suitable for direct operation of the hydraulic control, the electronic control apparatus may be reduced to one simple circuit function. The use of digital circuit elements, on the other hand, provides the advantage that the circuit elements may be of simpler construction, lessening the risk of an adverse influence on function due to dirt. Besides, when digital circuit elements are used, they may be fewer in number than in the case of analog circuit elements; thus for example three digital circuit elements will suffice to call up eight different programmings of the electronic control apparatus, i.e. alternatively eight different attachments may be used in connection with the support vehicle without requiring manual adaptation of the basic setting of the hydraulic system. By contrast, in the case of analog circuit elements, generally a special circuit element must be provided for each quantity to be adjusted in the hydraulic system, i.e. when there are four quantities to be controlled, such as for example volume flow, maximum pressure, minimum pressure and drive mode (depending on engine speed or road speed), as a rule four analog circuit elements are required.

The switches may act upon the electronic control apparatus or the hydraulic control in any known manner, i.e. within the scope of the invention, electrical, hydraulic, pneumatic and other switches, and corresponding circuitry, may be employed. In a preferred embodiment, electrical connections are made by actuation of the switches.

In a preferred embodiment of the drive connection according to the invention, provision is made for the circuit elements, or the programming stored in the electronic control apparatus and called up by their actuation, to be able to influence at least the following variables of the hydraulic system: number and/or type of the hydraulic pumps to be activated, volume flow or pump angle of attack of the pumps called upon, maximum and/or minimum pressure of the hydraulic system, maximum volume flow at maximum pressure in the hydraulic system. Likewise preferably, the optimum pump characteristic for the attachment in question is selected by actuation of the circuit elements when the attachment is hooked up. Provision may also be made to effect the combination of several hydraulic and/or pump flows by actuation of the circuit elements. In this way, those variables of the hydraulic system are automatically adjusted when the particular attachment is hooked up which suffice for the preponderant number of attachments; any special additional boundary conditions required for operation of a particular attachment may be adjusted manually as well.

In a further preferred embodiment of the drive connection according to the invention, the circuit elements also serve to select the power take-off required for the particular attachment. Preferably, by actuation of the circuit elements, a choice may be made between an engine-related and a camshaft-related auxiliary drive. Another take-off preferred for certain attachments has a rotational speed proportional to the road speed.

Depending on service conditions, mechanical switches such as cam or roller switches, or alternatively contactless switches, are preferred as circuit elements.

While mechanical switches are generally rugged and economical, in certain cases an impairment of function by dirt, ice formation etc. cannot be ruled out. For this reason contactless switches will generally be preferred. In that case, a preferred arrangement consists in that the contactless switches are disposed according to a preassigned function matrix on a switchboard at the vehicle end, associated at the attachment end with a metal plate that approaches the switch plate when coupled in, with interruptions at the location of each switch that is not to be actuated. Thus only those switches on the switchboard are actuated for which the metal plate is not interrupted; the proper configuration of the actuated switches corresponds to a code that will call up the programming of the hydraulic system as provided for the connected attachment from the electronic control apparatus. The contactless switches to be so used may function on all sorts of different known principles, utilizing optical, acoustic, electromagnetic and the like effects.

Figure 2:
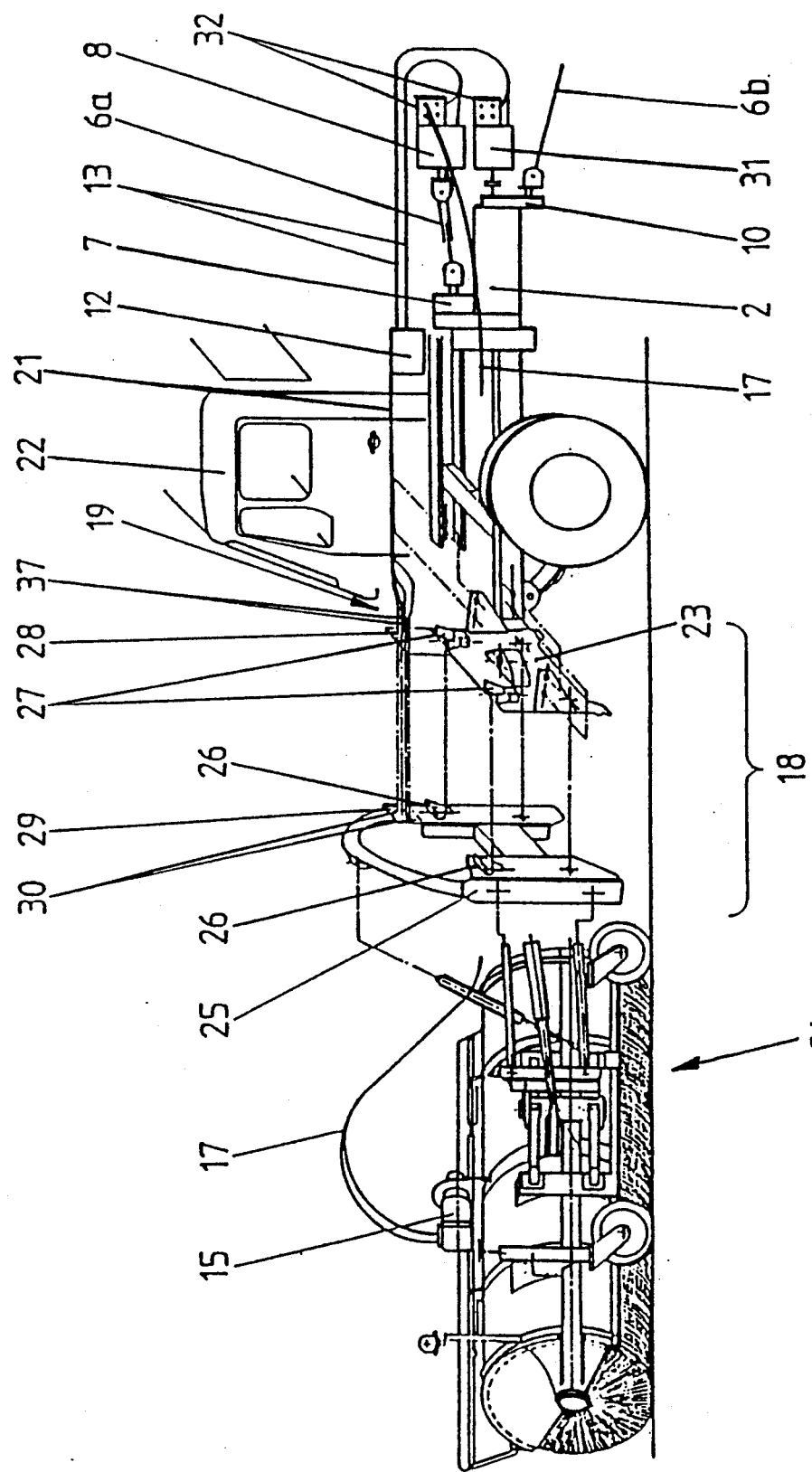
Figure 3:
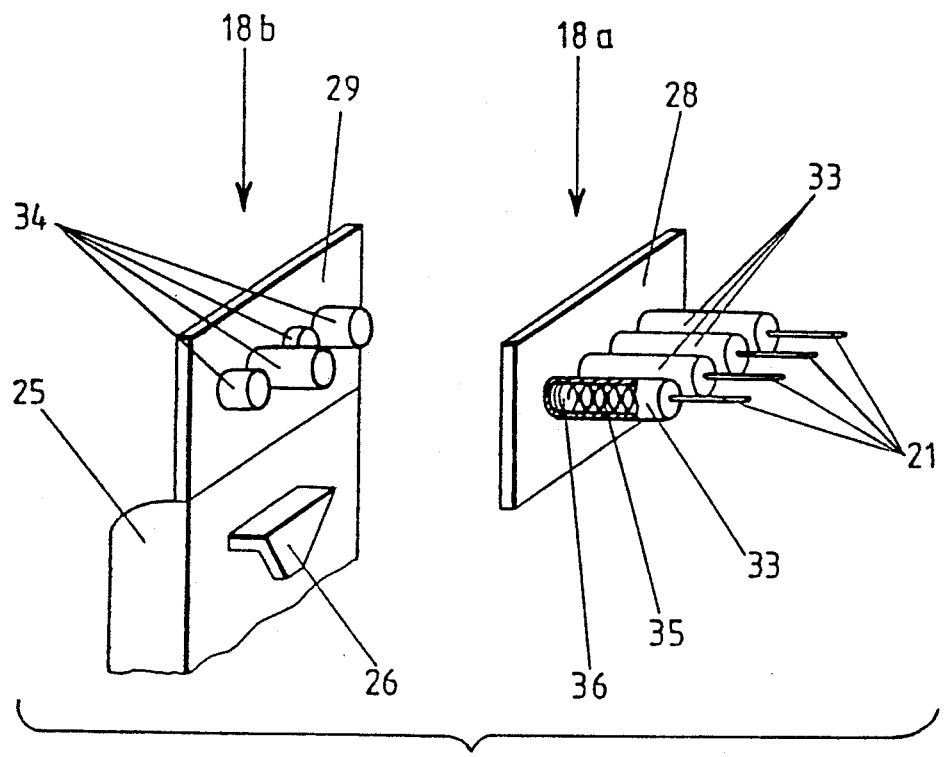
Figure 4:
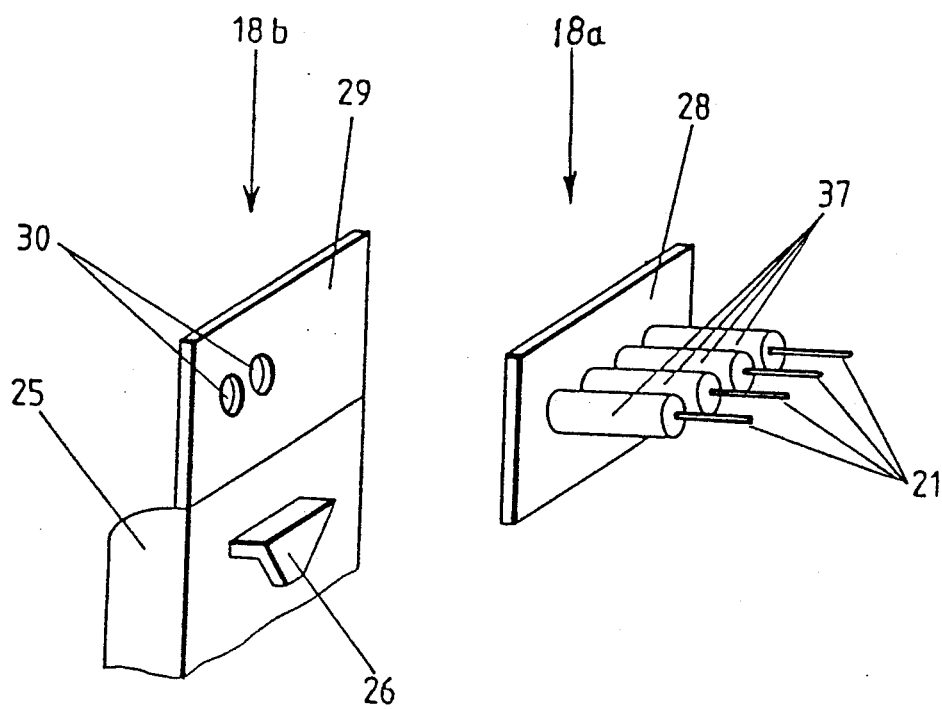

In the following, embodiments of the invention will be illustrated in more detail with reference to the drawing by way of example. In the drawing, FIG. 1 schematically shows the structure of an embodiment of the drive connection according to the invention, with associated hydraulic system of the support vehicle;

FIG. 2 shows an advantageous design embodying the drive connection according to the invention, FIG. 3 shows a system of analog circuit elements, and FIG. 4 shows a system of digital circuit elements.

In FIG. 1, the parts and assemblies associated with the support vehicle are separated from those associated with the attachments by a dot-dash line A.

The drive of the support vehicle comprises an engine 1, providing the power required to drive the vehicle as well as the hydraulic system. The vehicle is thus driven by way of a change gear 2 and a distribution gear 3 on the front axle 4 and the rear axle 5 of the support vehicle. The transmission of torque is effected in conventional manner by means of articulated shafts 6b–6d.

The power required to operate the hydraulic system is taken off from the motor 1 by way of an auxiliary transmission 7. In the present embodiment, for example, the speed of the auxiliary transmission 7 is proportional to that of the engine 1, so that the speed of the hydraulic pumps 8, 9, connected to the transmission 7 by way of an articulated shaft 6a, is likewise proportional to that of the engine. On the change gear 2, still another auxiliary transmission 10 is provided, its speed being proportional to the road speed of the support vehicle; this additional transmission 10 may likewise drive one or more hydraulic pumps—not shown—of the hydraulic system.

The hydraulic system of the support vehicle further comprises a hydraulic control represented by way of example in FIG. 1 by a switch valve 11. An electronic control apparatus 12 acts by way of control lines 13 on the variable hydraulic pumps 8, 9 and on the switch valve 11. By way of the electronic control apparatus 12, all basic data of the hydraulic system, as for example certain pressure and flow conditions, may be adjusted.

The attachment 14 schematically shown attached to the support vehicle has two hydraulic motors 15, 16 as drive units for various functions of the attachment. These hydraulic motors 15, 16 are connected by hydraulic lines 17 to the hydraulic system of the support vehicle. The drive connection 18a, 18b whereby the attachment 14 is coupled to the support vehicle comprises at its vehicle end 18a five switches 19, two of which are actuated by corresponding cams 20 provided at the attachment end 18b of the drive connection. The five switches 19 are connected by lines 21 to the electronic control apparatus 12, which transmit the information constituted by actuation of the corresponding switches 19 to the electronic control apparatus 12. In the present embodiment by way of example, the configuration of actuated switches 19 corresponds to a certain code whereby a basic setting of the hydraulic system fixedly programmed in and tuned to the attachment 14 is called up from the electronic control apparatus 12.

FIG. 2 shows a structural embodiment of the drive connection for use in conjunction with a sweeper 24 as attachment. The drive connection 18 comprises a plate 23 fixed to the support vehicle 22 at the front end, designed to accept a frame 25 fixed to the sweeper 24. This frame has two prongs 26 that engage matching guides 27 on the vehicle plate 23 and thereby position the frame 25 in relation to the plate. In this way it is ensured that the switches 19 arranged on a switch plate 28 and matching surfaces provided to actuate the switches on a metal plate 29 arranged on the frame 25 will meet precisely. The switches 19 are in the form of optical sensors 37 whose signals, transmitted over lines 21 to the electronic control apparatus 12 depend on whether the areas of the metal plate 29 facing them have openings 30 or not.

In departure from the embodiment shown by way of example in FIG. 1, in addition to the hydraulic pump 8 driven at a speed proportional to the engine speed in FIG. 2, there is another hydraulic pump 31, driven by way of the auxiliary take-off 10 at a speed proportional to the road speed of the support vehicle. The hydraulic control 32 provided on each hydraulic pump controls the flow direction, pressure etc. in the hydraulic lines 17 supplying a hydraulic motor 15 on the sweeper to drive the rotary brush according to the signals transmitted from the electronic control apparatus 12 over the control lines 13.

In other respects, the parts and assemblies shown correspond to those of FIG. 1, so that reference may be made to the pertinent explanations above.

FIG. 3 shows a modification of the drive connection according to FIG. 2, such that four circuit elements transmit analog signals that may be able to act directly upon the hydraulic controls of the hydraulic system if desired. In this example, the circuit elements on the vehicle end 18a of the drive connection comprise cylinders 33 and those at the attachment end 18b of the drive connection comprise pistons 34 that enter the cylinders 33 in coupled condition. The cylinders 33 are filled with hydraulic fluid and hermetically sealed at their end towards the pistons 34 by an axially displaceable sealing piston 36 loaded by a compression spring 35. According to their axial extent, the pistons 34 entering the cylinders 33 displace various quantities of fluid into the pressure lines 21 by displacement of the sealing piston 36, providing an analog signal for further processing in the electronic control apparatus and/or direct control of the hydraulic system. Other analog circuit elements such as for example capacitive switches may of course be employed in like manner.

FIG. 4 shows an enlarged view of an arrantement of digital switches such as may be employed in the drive connection of FIG. 2. On the switch plate 28 disposed at the drive connection on the vehicle side, four optical sensors 37 arranged side by side. If more advantageous under given conditions, any other arrangement may be adopted instead, such as for example one above another, at the vertices of a square etc. The metal plate 29 on the frame 25 of the attachment end 18b of the drive connection has two openings 30 facing the first and the second optical sensor. As a result, when the attachment is coupled, only the third and fourth sensors are actuated, so that the information transmitted over lines 21 to the electronic control apparatus corresponds to the digital code 0011.

I claim:

1. A drive connection on a support vehicle for interchangeable hydraulically driven attachments to be coupled thereto, comprising at least one hydraulic pump provided on the vehicle for driving at least one hydraulic motor on a particular attachment and vehicle associated hydraulic control means; an electronic control apparatus for adjusting said hydraulic control means and being programmable according to basic data requirements for the hydraulic drive of the particular attachment to be coupled to the vehicle; means for mechanically coupling the particular attachment to the vehicle; and a plurality of switches including vehicle-related circuit elements located on said vehicle and attachment-related circuit elements located on said attachments, said switches being connected to said electronic control apparatus to act upon the same such that when the particular attachment is mechanically coupled to the vehicle by said coupling means, said attachment-related circuit elements are brought into engagement with said vehicle-related circuit elements for actuating particular ones of said plurality of switches, the programming taking place automatically according to the basic data requirements for the hydraulic drive of the particular attachment.

2. Drive connection according to claim 1, further comprising a plate (23) on the vehicle, to which the vehicle-related circuit elements (19, 37, 33) are fixedly connected, and a frame (25) capable of being coupled from the attachment to the plate (23), to which the attachment-related circuit elements (20, 30, 34) are fixedly connected, the vehicle-related circuit elements (19, 37, 33) being connected by lines (21) to the electronic control apparatus.

3. Drive connection according to claim 1, wherein said circuit elements are adapted for programming at least the following basic data requirements for each attachment:

(a) Selection of the hydraulic pumps to be activated according to number and/or type,
(b) Adjustment of volume flow and/or angle of attack of the selected hydraulic pumps,
(c) Adjustment of maximum and/or minimum pressure of the hydraulic system,
(d) Setting maximum volume flow at maximum pressure in the hydraulic system.

4. Drive connection according to claim 3, in the form of an auxiliary power connection to an engine of the support vehicle, further comprising an auxiliary take-off connection, constructed in the form of one of an engine-related auxiliary drive and a camshaft-related auxiliary drive, said auxiliary take-off connection being selectively adjustable by actuation of said circuit elements.

5. Drive connection according to claim 1, wherein the programming is triggered by a digital code routed to the electronic control apparatus from digitally operating circuit elements.

6. Drive connection according to claim 1, wherein said circuit elements (19, 20) are mechanical switches selected from the group consisting of cam switches and roller switches.

7. Drive connection according to claim 1, wherein said circuit elements (19, 20) include contactless switches (37).

8. Drive connection according to claim 1, wherein electrical connections are made by actuating the switches.

9. Drive connection according to claim 1, further comprising a vehicle-side switch plate (28) and a metal plate (29) on the attachment side, wherein said vehicle-related circuit elements of said switches are disposed on the vehicle-side switch plate (28) associated on the attachment side with the metal plate (29) carrying said attachment-related circuit elements and approaching the switch plate (28) upon coupling.

10. Drive connection according to claim 9, wherein said switches include contactless switches (37) disposed on the vehicle-side switch plate (28), said metal plate (29) having openings at locations of each switch (37) which is not to be actuated.

11. Drive connection according to claim 10, wherein the contactless switches are optical sensors.

12. Drive connection according to claim 9, wherein said vehicle-related circuit elements of said switches are hydraulic cylinders (33) loaded with sealing pistons axially displaceable therein and said attachment-related circuit elements are pistons (34) adapted to enter said cylinders in a coupled condition of said attachment.

* * * * *